US010759410B2

(12) United States Patent
Aoki et al.

(10) Patent No.: US 10,759,410 B2
(45) Date of Patent: Sep. 1, 2020

(54) DRIVE FORCE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kazuma Aoki, Sunto-gun (JP); Tatsuya Imamura, Okazaki (JP); Yasuhiro Oshiumi, Gotemba (JP); Kentaro Kanzaki, Mishima (JP); Yukari Okamura, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 227 days.

(21) Appl. No.: 16/043,646

(22) Filed: Jul. 24, 2018

(65) Prior Publication Data

US 2019/0047543 A1 Feb. 14, 2019

(30) Foreign Application Priority Data

Aug. 9, 2017 (JP) .................................. 2017-153836

(51) Int. Cl.
*B60W 20/10* (2016.01)
*B60W 10/06* (2006.01)
(Continued)

(52) U.S. Cl.
CPC ............. *B60W 20/10* (2013.01); *B60K 6/445* (2013.01); *B60W 10/06* (2013.01); *B60W 10/08* (2013.01);
(Continued)

(58) Field of Classification Search
CPC ...... B60W 20/10; B60W 20/13; B60W 10/06; B60W 10/08; B60W 10/26;
(Continued)

(56) References Cited

U.S. PATENT DOCUMENTS

| 6,321,144 B1* | 11/2001 | Crombez ............ B60L 15/2009 |
| | | 303/152 |
| 2007/0249461 A1* | 10/2007 | Tsuji ..................... B60W 20/00 |
| | | 477/3 |
| 2009/0114464 A1 | 5/2009 | Imamura et al. |
| 2010/0201293 A1* | 8/2010 | Yoshida ................ B60L 3/0046 |
| | | 318/139 |

(Continued)

FOREIGN PATENT DOCUMENTS

| JP | 9-46821 A | 2/1997 |
| JP | 2017-007437 A | 1/2017 |

*Primary Examiner* — Calvin Cheung
(74) *Attorney, Agent, or Firm* — Sughrue Mion, PLLC

(57) ABSTRACT

A control system for hybrid vehicles to prevent a reduction in a drive force when an output power of a battery is restricted. A first motor translates an output power of the engine partially into an electric power. A transmission mechanism distributes an output torque of the engine to the first rotary machine side and an output member side. A second motor is operated by one of the electric power translated by the first rotary machine and an electric power accumulated in the battery to generate a power. An operating mode can be selected from a first mode in which the output torque of the engine is delivered to the output member side at a first ratio, and a second mode in which the output torque of the engine is delivered to the output member side at a second ratio. The second ratio is smaller than the first ratio. A controller is configured to restrict selection of the first mode when an available output power of the battery to be supplied to the second rotary machine is smaller than a predetermined value.

10 Claims, 18 Drawing Sheets

(51) Int. Cl.
*B60W 10/08* (2006.01)
*B60W 20/13* (2016.01)
*B60K 6/445* (2007.10)
*B60W 10/26* (2006.01)

(52) U.S. Cl.
CPC ............ *B60W 10/26* (2013.01); *B60W 20/13* (2016.01); *B60W 2510/244* (2013.01); *B60W 2510/246* (2013.01); *B60W 2520/10* (2013.01); *B60W 2710/0605* (2013.01); *B60W 2710/0644* (2013.01); *B60W 2710/0666* (2013.01); *B60W 2710/0677* (2013.01); *B60W 2710/081* (2013.01); *B60W 2710/083* (2013.01); *B60W 2710/086* (2013.01); *B60W 2710/1005* (2013.01); *B60W 2710/248* (2013.01)

(58) Field of Classification Search
CPC ..... B60W 2510/244; B60W 2510/246; B60W 2520/10; B60W 2710/0605; B60W 2710/0644; B60W 2710/0666; B60W 2710/0677; B60W 2710/081; B60W 2710/083; B60W 2710/086; B60W 2710/1005; B60W 2710/248; B60K 6/445
See application file for complete search history.

(56) References Cited

U.S. PATENT DOCUMENTS

| | | | | |
|---|---|---|---|---|
| 2011/0183801 | A1* | 7/2011 | Ando | B60K 6/365 475/5 |
| 2011/0246009 | A1* | 10/2011 | Hase | B60W 10/08 701/22 |
| 2012/0059542 | A1* | 3/2012 | Kawai | B60W 20/00 701/22 |
| 2012/0078456 | A1* | 3/2012 | Hakumura | B60W 30/188 701/22 |
| 2012/0270698 | A1* | 10/2012 | Hisada | B60W 10/02 477/5 |
| 2014/0288754 | A1* | 9/2014 | Kasuya | F16D 48/08 701/22 |
| 2015/0112533 | A1* | 4/2015 | Kawai | B60W 10/06 701/22 |
| 2015/0224983 | A1* | 8/2015 | Hiasa | B60K 6/445 475/2 |
| 2015/0314770 | A1* | 11/2015 | Kitabatake | B60K 6/445 477/9 |
| 2016/0090075 | A1 | 3/2016 | Martin et al. | |
| 2016/0169374 | A1* | 6/2016 | Kanada | B60K 6/365 475/5 |
| 2016/0368361 | A1 | 12/2016 | Endo et al. | |

* cited by examiner

Fig. 4

| Operating Mode | | | CL1 | CL2 | B1 | MG1 | MG2 | ENG |
|---|---|---|---|---|---|---|---|---|
| HV Mode | HV-Lo Mode | | ● | – | – | G | M | ON |
| | HV-Hi Mode | | – | ● | – | G | M | ON |
| | Fixed Mode | | ● | ● | – | | | ON |
| EV Mode | Dual-Motor Mode | EV-Lo Mode | – | – | ● | M | M | OFF |
| | | EV-Hi Mode | – | ● | ● | M | M | OFF |
| | Single-Motor Mode | | – | – | – | | M | OFF |

DRIVE FORCE CONTROL SYSTEM FOR HYBRID VEHICLE

CROSS REFERENCE TO RELATED APPLICATIONS

The present disclosure claims the benefit of Japanese Patent Application No. 2017-153836 filed on Aug. 9, 2017 with the Japanese Patent Office, the disclosure of which are incorporated herein by reference in its entirety.

BACKGROUND

Field of the Invention

Embodiments of the present disclosure relate to the art of a drive force control system for a hybrid vehicle, in which an output torque of a rotary machine driven by electricity translated from an output torque of the engine is synthesized with the engine torque.

Discussion of the Related Art

JP-A-2017-007437 describes a drive unit for a hybrid vehicle in which an output torque of an engine is distributed to a first motor and to an output side through a power split mechanism, and in which an output torque of a second motor driven by electricity supplied from the first motor is synthesized with the engine torque. In the drive unit taught by JP-A-2017-007437, the power split mechanism is adapted to establish a low mode in which a ratio of the power delivered to the output side to the power delivered to the first motor is relatively large, and a high mode in which the above-mentioned ratio is relatively small.

A speed of the engine may be restricted to limit damage on rotary members of the power split mechanism, and a limit speed of the engine in the low mode is lower than that in the high mode. A maximum output torque of the engine gradually increases with an increase in an engine speed, and a change in the maximum output torque of the engine is smaller than that of the engine speed. That is, the upper limit power of the engine is greatly affected by the engine speed. If the engine speed is thus restricted, a maximum output torque of the engine is also restricted. Specifically, in the low mode, the upper limit power of the engine is reduced in comparison with that in the high mode.

However, in the low mode, a ratio of the torque delivered to the output side is larger than that in the high mode, and hence the large torque may be delivered to the output side even if the output torque of the engine is restricted. That is, if it is possible to supply electricity sufficiently from a battery to the second motor, the second motor is allowed to generate a rated torque (i.e. a maximum torque) irrespective of a generation amount of the first motor. Accordingly, if the electricity can be supplied sufficiently from the battery to the second motor, a larger drive force may be generated by shifting the operating mode from the high mode to the low mode even if the engine output is restricted.

By contrast, if the electricity cannot be supplied sufficiently from the battery to the second motor, an available output torque of the second motor is determined depending on the generation amount of the first motor. In the low mode, a ratio of the power delivered to the first motor is smaller than that in the high mode, and the output torque of the engine is restricted as explained above. For these reasons, the generation amount of the first motor is reduced in the low mode in comparison with that in the high mode. Consequently, if the electricity cannot be supplied sufficiently from the battery to the second motor, the maximum output torque of the second motor may be decreased in the low mode in comparison with that in the high mode. For this reason, if the low mode and the high mode are selected based on a unified condition, a maximum drive force may be reduced excessively when the electricity cannot be supplied sufficiently from the battery to the second motor.

SUMMARY

Aspects of embodiments of the present disclosure have been conceived noting the foregoing technical problems, and it is therefore an object of the present disclosure is to provide a control system for hybrid vehicles configured to prevent a reduction in a maximum drive force when electricity cannot be supplied sufficiently from the battery to the second motor.

Driving force control system according to the embodiment of the present disclosure is applied to a hybrid vehicle comprising: an engine; a first rotary machine that translates an output power of the engine partially into an electric power; a transmission mechanism that distributes an output torque of the engine to the first rotary machine side and an output member side, wherein an operating mode can be selected from a first mode in which the output torque of the engine is delivered to the output member side at a first predetermined ratio, and a second mode in which the output torque of the engine is delivered to the output member side at a second predetermined ratio that is smaller than the first predetermined ratio; a battery; and a second rotary machine to which at least one of the electric power translated by the first rotary machine and an electric power accumulated in the battery is supplied to generate a power. The control system is configured to generate a maximum drive force to propel the vehicle by operating the engine to generate an upper limit power, while operating the second rotary machine to generate a power by supplying the electric power translated by the first rotary machine and a maximum output power of the battery to the second rotary machine. In order to achieve the above-explained objective, according to the embodiment of the present disclosure, a controller that controls the transmission mechanism is configured to restrict selection of the first mode when an available output power of the battery to be supplied to the second rotary machine is smaller than a predetermined value.

In a non-limiting embodiment, the threshold power may include an output power of the battery possible to reduce the maximum drive force in the first mode smaller than the maximum drive force in the second mode.

In a non-limiting embodiment, the predetermined value may be reduced with an increase in the upper limit power of the engine.

In a non-limiting embodiment, the upper limit power of the engine may be calculated by multiplying a maximum output torque of the engine by an upper limit speed of the engine, and the upper limit speed of the engine in the first mode may be set to be lower than the upper limit speed of the engine in the second mode.

In a non-limiting embodiment, the transmission may comprise a plurality of rotary elements, and the upper limit speed of the engine may be raised with an increase in an upper limit speed of a predetermined rotary element in the rotary elements.

In a non-limiting embodiment, the upper limit speed of the predetermined rotary element may be lowered with a temperature rise of the predetermined rotary element, and the upper limit speed of the predetermined rotary element may be raised with an increase in an amount of lubricant supplied to the predetermined rotary element.

In a non-limiting embodiment, the controller may be further configured to restrict the selection of the first mode when a vehicle speed is higher than a predetermined speed.

In a non-limiting embodiment, the controller may be further configured to execute a cancellation control to cancel the restriction of selection of the first mode by increasing the available output power of the battery supplied to the second rotary machine.

In a non-limiting embodiment, the available output power of the battery may be restricted when a temperature of the battery is raised higher than a predetermined temperature. The drive force control system may further comprises a cooling device, and the cancellation control may include a control to cool the battery by the cooling device more promptly during restricting the selection of the first mode, in comparison with a case in which the selection of the first mode is not restricted.

In a non-limiting embodiment, the controller may be further configured to: select an operating mode of the hybrid vehicle from a hybrid mode in which the hybrid vehicle is powered by the engine and the second rotary machine, and an electric vehicle mode in which the hybrid vehicle is powered by the second rotary machine without using the engine; and start the engine when a required power is greater than a predetermined power. In addition, the cancellation control may include a control to decrease the predetermined power when the selection of the first mode is restricted, in comparison with a case in which the selection of the first mode is not restricted.

Thus, according to the embodiments of the present disclosure, the operating mode of the transmission can be selected from the first mode in which the output torque of the engine is delivered to the output member side at a first predetermined ratio, and the second mode in which the output torque of the engine is delivered to the output member side at the second predetermined ratio that is smaller than the first predetermined ratio. According to the embodiment, therefore, a large power may be applied to the output member through the transmission by selecting the first mode. In addition, at least one of the electric power translated by the first rotary machine and the electric power accumulated in the battery is supplied to the second rotary machine. According to the embodiment, therefore, the maximum drive force to propel the hybrid vehicle may be increased by selecting the first mode, when the electricity can be supplied sufficiently from the battery to the second motor. In the first mode, since the ratio of the power delivered to the first rotary machine side is small, the maximum drive force will be reduced significantly when the available output power of the battery to be supplied to the second rotary machine is reduced. In order to prevent such reduction in the maximum drive force, according to the embodiment, the controller is configured to restrict the selection of the first mode in such situation.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 4 is a table showing engagement states of engagement devices and operating conditions of the prime movers in each operating mode;

DETAILED DESCRIPTION OF THE PREFERRED EMBODIMENT(S)

Figure 1:
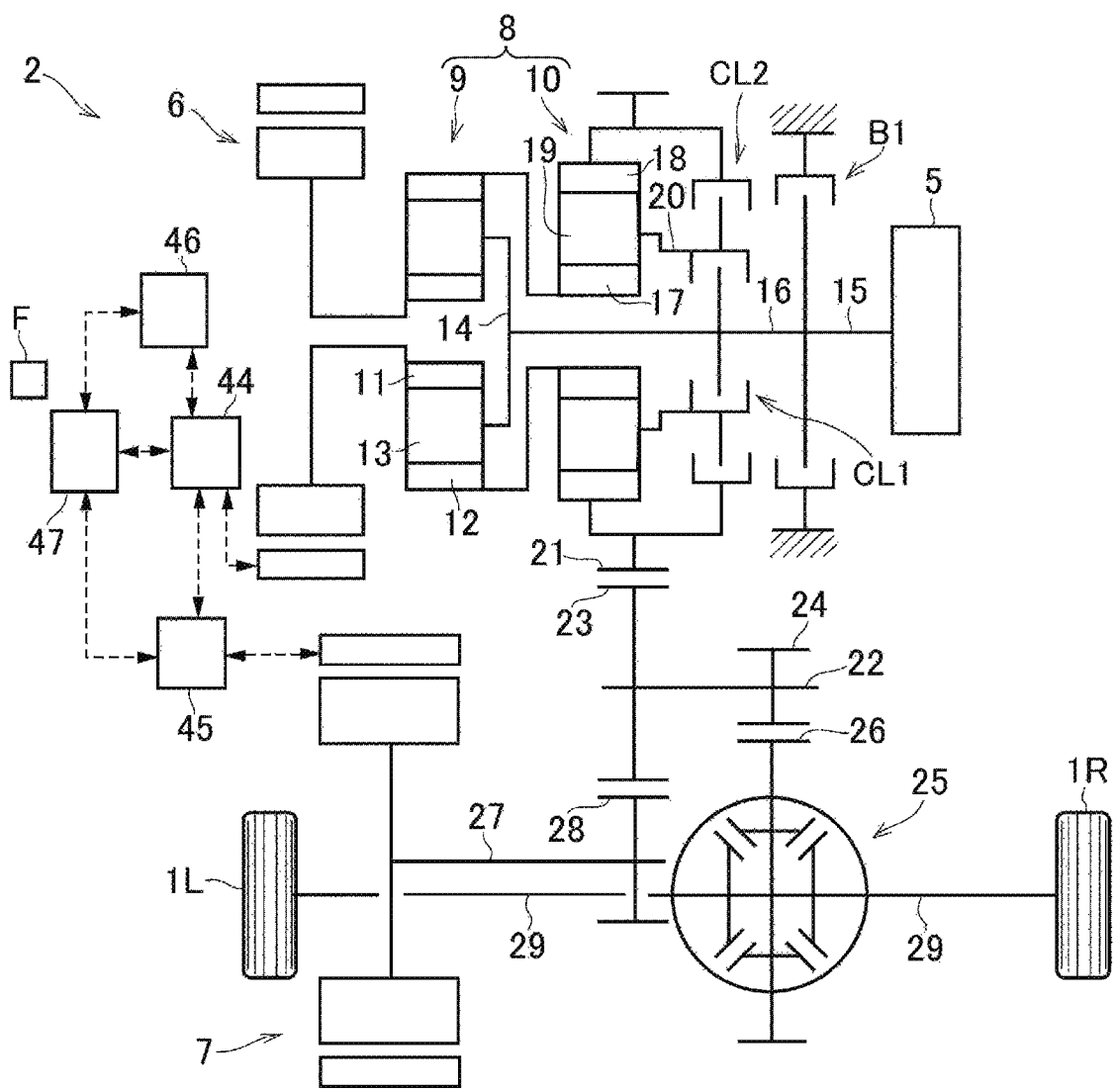
FIG. 1 is a skeleton diagram showing a first drive unit of the hybrid vehicle according to at least one embodiment of the present disclosure.
Figure 2:
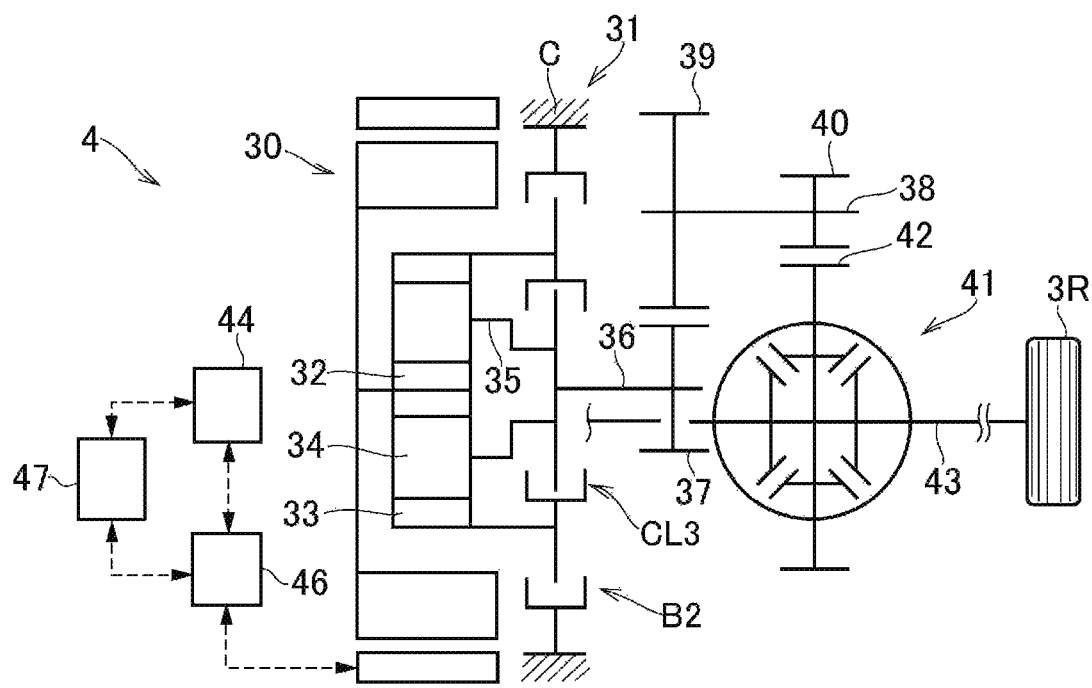
FIG. 2 is a skeleton diagram showing a second drive unit of the hybrid vehicle according to at least one embodiment of the present disclosure.

Preferred embodiments of the present disclosure will now be explained with reference to the accompanying drawings. Referring now to FIGS. 1 and 2, there are shown the first embodiment of the hybrid vehicle according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The hybrid vehicle is provided with an engine 5, a first motor 6 (abbreviated as "MG1" in the drawings) and a second motor 7 (abbreviated as "MG2" in the drawings). Specifically, the first motor 6 is a motor-generator having a generating function. In the hybrid vehicle according to the first embodiment, a speed of the engine 5 is controlled by the first motor 6, and the second motor 7 is driven by electric power generated by the first motor 6 to generate a drive force for propelling the vehicle. Optionally, the second motor 7 may also be used as the motor-generator having a generating function. In the hybrid vehicle, accordingly, the first motor 6 serves as a first rotary machine.

A power split mechanism 8 as a transmission is connected to the engine 5. The power split mechanism 8 includes a power split section 9 that distributes the engine torque to the first motor side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 with the carrier 14 of the power split section 9. To this end, for example, a wet-type multiple plate clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the hybrid vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47. In order to prevent a restriction of an electrical input to the battery 47 and to reduce a thermal damage on the battery 47, the battery 47 is cooled by a cooling fan F as a cooling device. In the hybrid vehicle according to the embodiment, the second motor 7 and the rear motor 30 serve as a second rotary machine.

Figure 3:
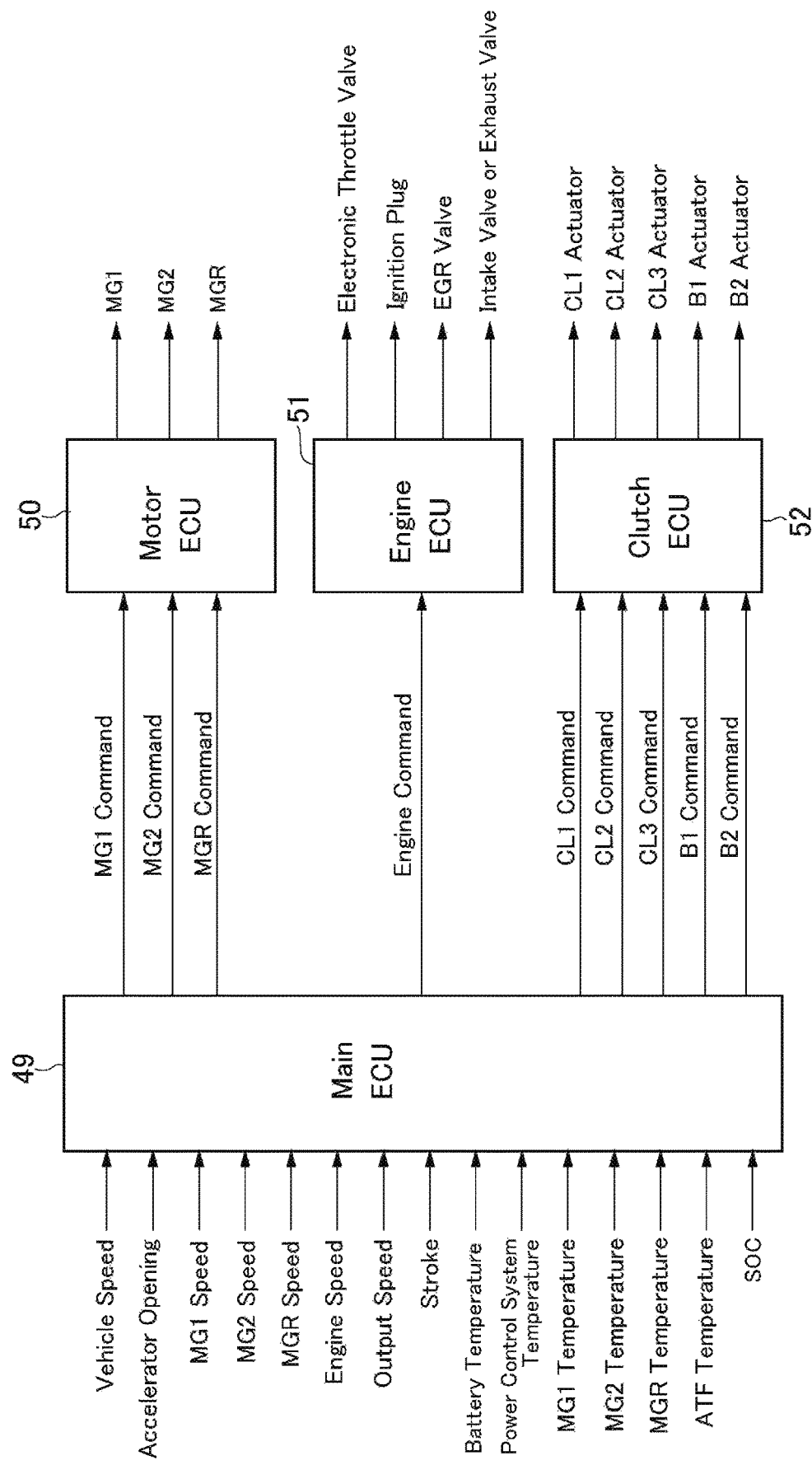
FIG. 3 is a block diagram showing a structure of an electronic control unit.

In order to control the first power control system 44, the second power control system 45, the third power control system 46, the engine 5, the clutches CL1, CL2, CL3, and the brakes B1,B2, the hybrid vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50 (abbreviated as "MG-ECU" in the drawings), an engine ECU 51, and a clutch ECU 52.

The main ECU 49 is configured to execute a calculation based on incident data from sensors as well as maps and formulas installed in advance, and transmits a calculation result to the motor ECU 50, the engine ECU 51, and the clutch ECU 52 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the ECUs 44, 45, and 46; a temperature of the first motor 6; a temperature of the second motor 7; a temperature of the rear motor 30; a temperature of oil (i.e., ATF) lubricating the power split mechanism 8 and the transmission 31; and a state of charge (to be abbreviated as the "SOC" hereinafter) level of the battery 47.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the hybrid vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals. In addition, the main ECU 49 also calculates a current value applied to the cooling fan F taking account of a temperature of the battery 47, and transmits calculation results to an actuator for activating the cooling fan in the form of command signal.

In the hybrid vehicle according to the embodiment, an operating mode may be selected from a hybrid mode (to be abbreviated as the "HV mode" hereinafter) in which the hybrid vehicle is propelled by a drive torque generated by the engine 5, and an electric vehicle mode (to be abbreviated as the "EV mode" hereinafter) in which the hybrid vehicle is propelled by drive torques generated by the first motor 6 and the second motor 7 without using the engine 5. The HV mode may be selected from a hybrid-low mode (to be abbreviated as the "HV-Lo mode" hereinafter) as a first mode of the embodiment, a hybrid-high mode (to be abbreviated as the "HV-Hi mode" hereinafter) as a second mode of the embodiment, and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a dual-motor mode in which both of the first motor 6 and the second motor 7 generate drive torques to propel the hybrid vehicle, and a single-motor mode in which only the second motor 7 generates a drive torque to propel the hybrid vehicle. Further, the dual-motor mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor. In the single-motor mode, the hybrid vehicle is powered only by the second motor 7, while engaging the first clutch CL1, while engaging the second clutch CL2, or while disengaging both of the first clutch CL1 and the second clutch CL2.

FIG. 4 shows engagement states of the first clutch CL1, the second clutch CL2, and the first brake B1, and operating conditions of the first motor 6, the second motor 7, and the engine 5 in each operating mode. In FIG. 4, "•" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque. During propulsion in the single-motor mode, an output power of the engine 5 may be translated entirely into an electric energy by operating the first motor 6 as a generator. In this case, since the engine 5 does not function as a prime mover, the status of the engine 5 is indicated as "OFF" in FIG. 3.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 5:
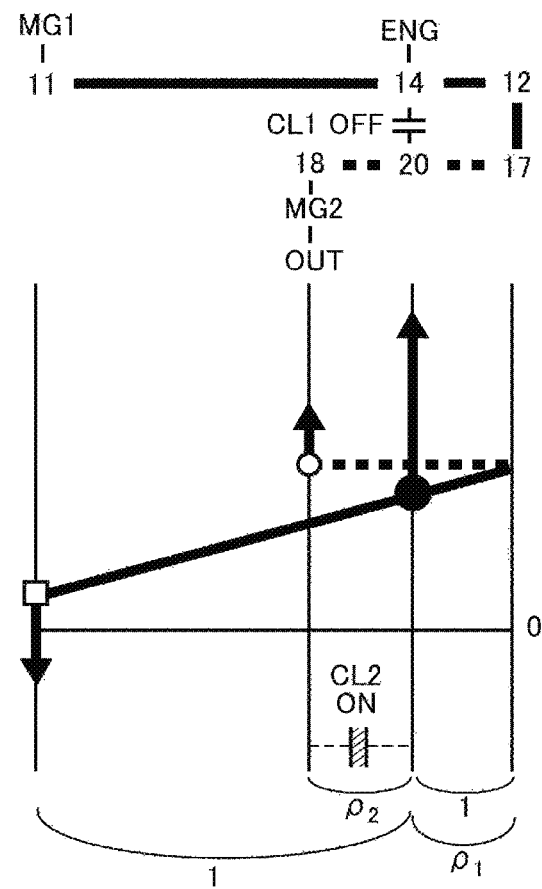
FIG. 5 is a nomographic diagram showing a situation in a HV-Hi mode.
Figure 6:
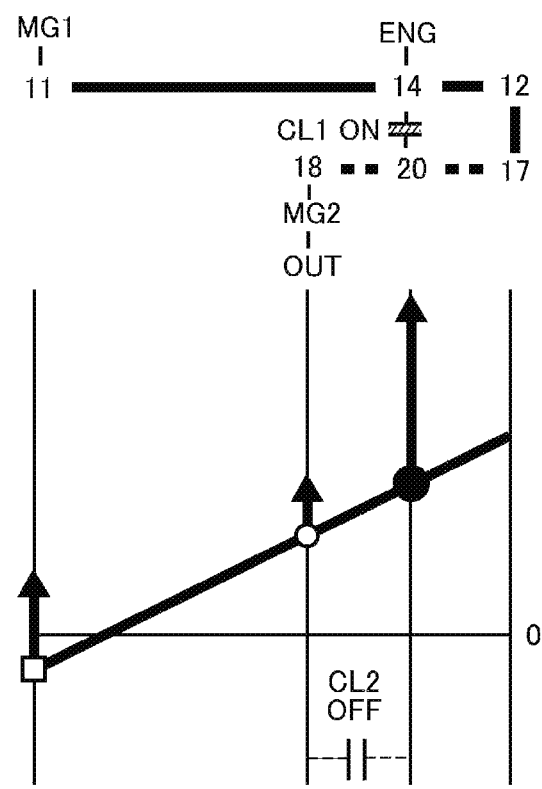
FIG. 6 is a nomographic diagram showing a situation in a HV-Lo mode.

As indicated in FIGS. 5 and 6, in the HV-Hi mode and the HV-Lo mode, any one of the first clutch CL1 and the second clutch CL2 is engaged, and the engine 5 generates a drive torque while establishing a reaction torque by the first motor 6. In this situation, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\rho1\cdot\rho2)$", and a ratio of the torque applied to the ring gear 18 in the HV-Hi mode may be expressed as "$1/(\rho1)$". In other words, given that the torque of the engine 5 is "1", a ratio of the torque of the engine 5 delivered to the ring gear 18 in the HV-Lo mode may be expressed as "$1/(1-(\rho1\cdot\rho2))$", and a ratio of the torque of the engine 5 delivered to the ring gear 18 in the HV-Hi mode may be expressed as "$1/(\rho1+1)$". In the above-expressed expressions, "$\rho1$" is a gear ratio of the power split section 9 (i.e., a ratio between teeth number of the ring gear 12 and teeth number of the sun gear 11), and "$\rho2$" is a gear ratio of the transmission section 10 (i.e., a ratio between teeth number of the ring gear 18 and teeth number of the sun gear 17). Specifically, "$\rho1$" and "$\rho2$" are individually smaller than "1". That is, in the HV-Lo mode, a ratio of the torque delivered to the ring gear 18 is increased in comparison with that in the HV-Hi mode. Accordingly, "$1/(1-(\rho1\cdot\rho2))$" corresponds to a first predetermined ratio of the embodiment, and "$1/(\rho1+1)$" corresponds to a second predetermined ratio of the embodiment. Further, the ring gear 18 and the driven gear 23 serve as an output member in the embodiment. Here, when the speed of the engine 5 is increased by the torque generated by the engine 5, the output torque of the engine 5 is calculated by subtracting a torque required to increase the speed of the engine 5 from a torque generated by the engine 5.

In the HV mode, the electric power generated by the first motor 6 is supplied to the second motor 7, and in addition, the electric power accumulated in the battery 47 is also supplied to the second motor 7 as necessary. In the hybrid vehicle, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained.

Figure 7:
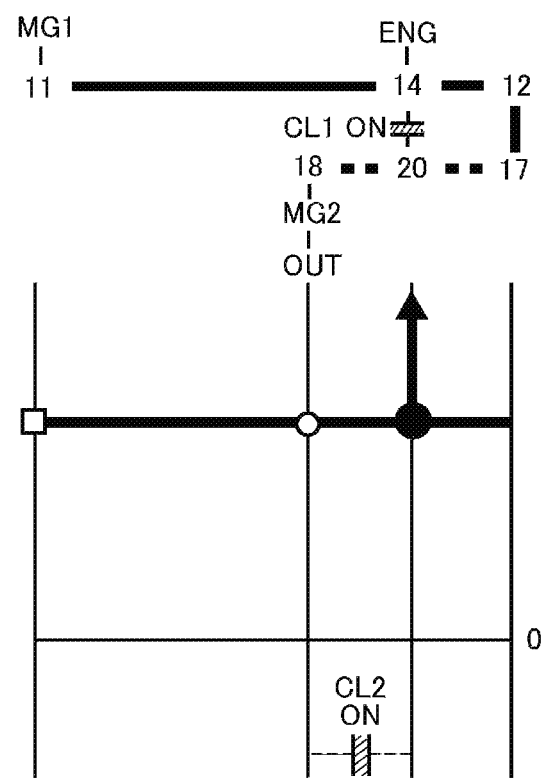
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. In other words, the output power of the engine 5 will not be translated into an electric energy by the first motor 6 and the second motor 7. For this reason, a power loss associated with such energy conversion will not be caused in the fixed mode and hence power transmission efficiency can be improved.

Figure 8:
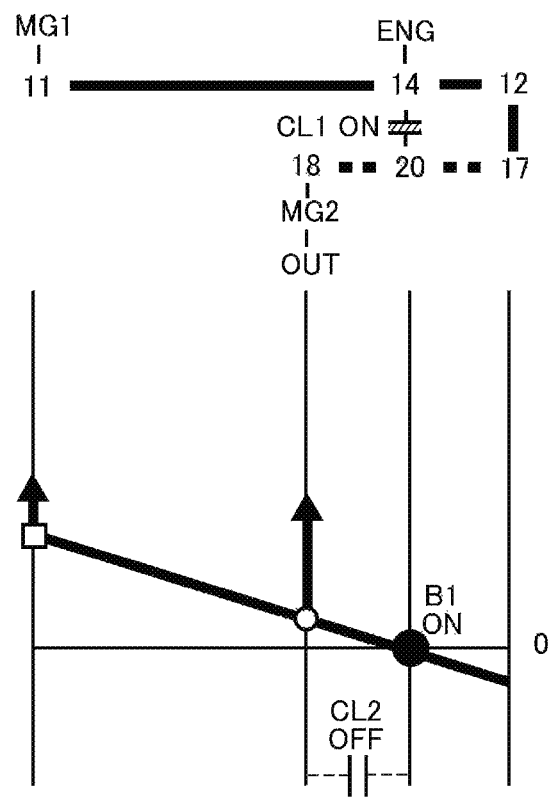
FIG. 8 is a nomographic diagram showing a situation in an EV-Lo mode.
Figure 9:
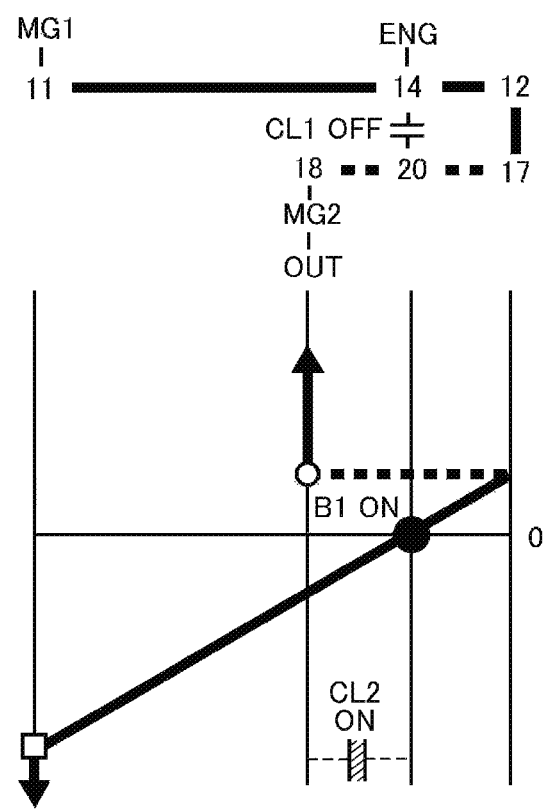
FIG. 9 is a nomographic diagram showing a situation in an EV-Hi mode.
Figure 10:
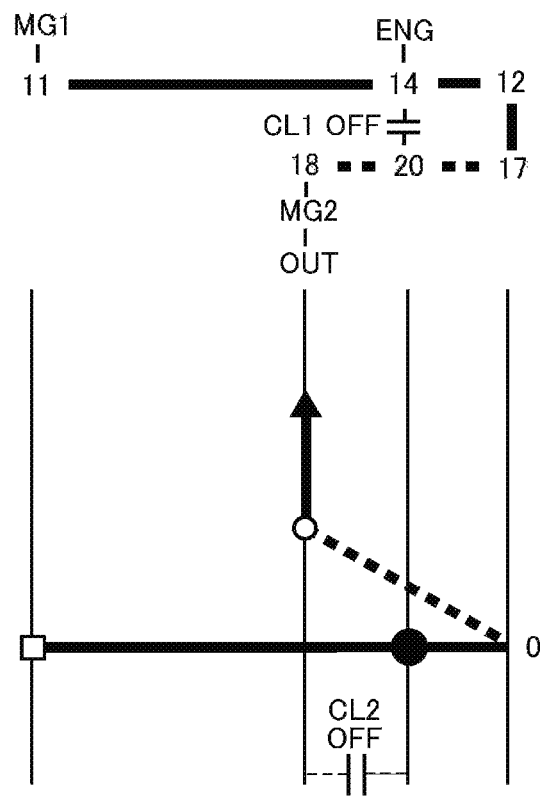
FIG. 10 is a nomographic diagram showing a situation in a single mode.

As indicated in FIGS. 8 and 9, in the EV-Lo mode and the EV-Hi mode, the first brake B1 is engaged, and the first motor 6 and the second motor 7 generates the drive torques to propel the hybrid vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the HV-Lo mode is greater than that in the HV-Hi mode so that a greater drive force is established in the EV-Lo mode. As indicated in FIG. 10, in the single-motor mode, only the second motor 7 generates a drive torque, and both of the clutch CL1 and the second clutch CL2 are disengaged. In the single-motor mode, therefore, all of the rotary elements on the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the hybrid vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
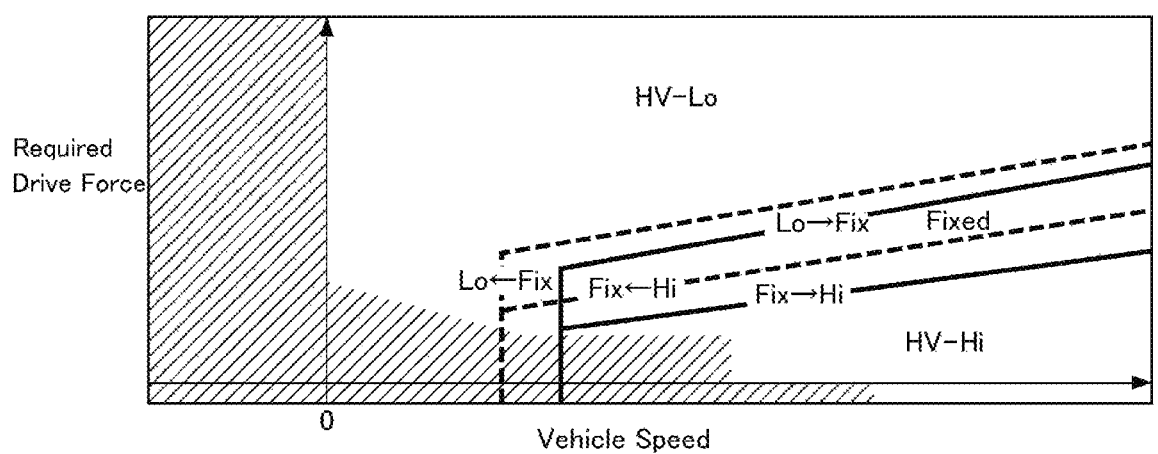
FIG. 11 shows a map for determining an operating mode during propulsion in a CS mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the single-motor mode is selected. In the CS mode, the single-motor mode is selected when the hybrid vehicle is propelled in a reverse direction irrespective of the required drive force, and when the hybrid vehicle is propelled in a forward direction and the required drive force is small (or when decelerating). Such area where the single-motor mode is selected is determined based on specifications of the second motor 7 and the rear motor 30.

During forward propulsion in the CS mode, the HV mode is selected when the large drive force is required. In the HV mode, the drive force may be generated from a low speed range to a high speed range. When the SOC level falls close to a lower limit level, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lo←Fix" line from right to left, or when the operating point is shifted across the "Lo←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 12:
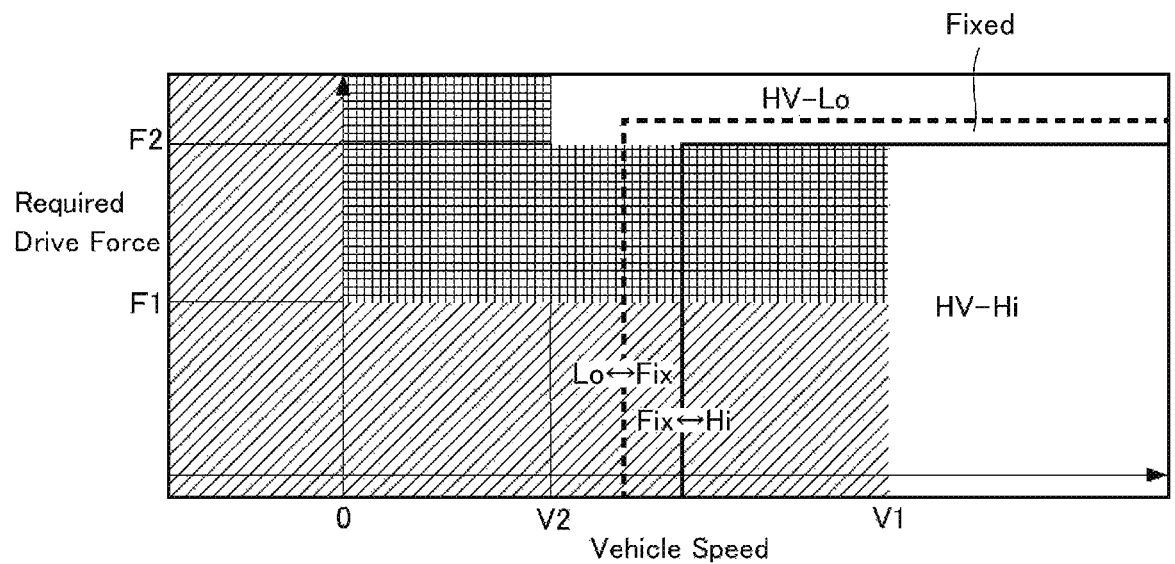
FIG. 12 shows a map for determining an operating mode during propulsion in a CD mode.

FIG. 12 shows an example of a map used to select the operating mode during propulsion in the CD mode. In FIG. 12, the vertical axis also represents the required drive force, and the horizontal axis also represents the vehicle speed.

In FIG. 12, the hatched area is also an area where the single-motor mode is selected. In the CD mode, the single-motor mode is selected when the hybrid vehicle is propelled in a reverse direction irrespective of the required drive force, and when the hybrid vehicle is propelled in a forward direction and the required drive force is smaller than a first threshold force value F1 (or when decelerating). Such area where the single-motor mode is selected is also determined based on specifications of the second motor 7 and the rear motor 30.

During forward propulsion in the CD mode, the dual-motor mode is selected when the drive force greater than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level of the battery 47 falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo↔Fix" line. Likewise, the operating mode is shifted from the HV-Hi mode and the fixed mode when the operating point is shifted across the "Fix↔Hi".

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

Figure 13:
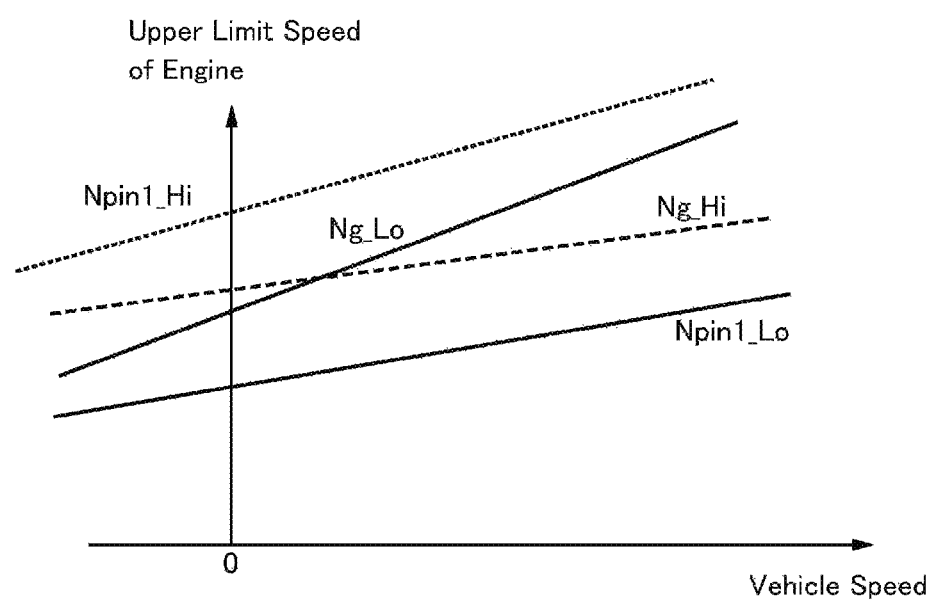
FIG. 13 is a graph showing an upper limit speed of the engine.

In the HV-Lo mode and the HV-Hi mode, the upper limit power of the engine 5 is governed by an upper limit speed of the engine 5. As indicated in FIG. 13, the upper limit speed of the engine 5 is determined based on upper limit speeds of the pinion gears 13 of the power split section 9, the first motor 6 and so on. In FIG. 13, the horizontal axis represents a vehicle speed, and a vertical axis represents an upper limit speed of the engine 5. In FIG. 13, the line Npin1-Lo indicates a change in the upper limit speed of the engine 5 set on the basis of the upper limit speed of the pinion gear 13 during propulsion in the HV-Lo mode. In this case, as indicated by the line Npin1-Lo, the upper limit speed of the engine 5 is increased mildly with an increase in the vehicle speed. In turn, the line Ng-Lo indicates a change in the upper limit speed of the engine 5 set on the basis of the upper limit speed of the first motor 6 during propulsion in the HV-Lo mode. In this case, as indicated by the line Ng-Lo, the upper limit speed of the engine 5 is increased at a relatively larger rate with an increase in the vehicle speed. As can be seen from FIG. 13, in the HV-Lo mode, the upper limit speed of the engine 5 set on the basis of the upper limit speed of the pinion gear 13 is lower than the upper limit speed of the engine 5 set on the basis of the upper limit speed of the first motor 6 over the entire speed range. In the HV-Lo mode, accordingly, the rotational speed of the engine 5 is limited based on the upper limit speed of the pinion gear 13. Accordingly, the sun gears 11, 17, the ring gears 12, 18, the pinion gears 13, 19, and the carriers 14, 20 correspond to "a plurality of rotary members", and the sun gear 11 connected to the pinion gears 13 and the first motor 6 corresponds to a "predetermined rotary member" of the embodiment.

In FIG. 13, the dashed line Npin1-Hi indicates a change in the upper limit speed of the engine 5 set on the basis of the upper limit speed of the pinion gear 13 during propulsion in the HV-Hi mode. As can be seen from FIG. 13, the upper limit speed of the engine 5 set on the basis of upper limit speed of the pinion gear 13 is higher in the HV-Hi mode over the entire speed range in comparison with that in the HV-Lo mode. Here, an increasing rate of the upper limit speed of the engine 5 set on the basis of upper limit speed of the pinion gear 13 in the HV-Hi mode is substantially identical to that in the HV-Lo mode. In turn, the dashed line Ng-Hi indicates a change in the upper limit speed of the engine 5 set on the basis of the upper limit speed of the first motor 6 during propulsion in the HV-Hi mode. In this case, as indicated by the dashed line Ng-Hi, the upper limit speed of the engine 5 is increased mildly with an increase in the vehicle speed. As can be seen from FIG. 13, in the HV-Hi mode, the upper limit speed of the engine 5 set on the basis of the upper limit speed of the first motor 6 is lower than the upper limit speed of the engine 5 set on the basis of the upper limit speed of the pinion gear 13 over the entire speed range. In the HV-Hi mode, accordingly, the rotational speed of the engine 5 is limited based on the upper limit speed of the first motor 6. Further, the upper limit speed of the engine 5 in the HV-Hi mode is higher than that in the HV-Lo mode.

Figure 14:
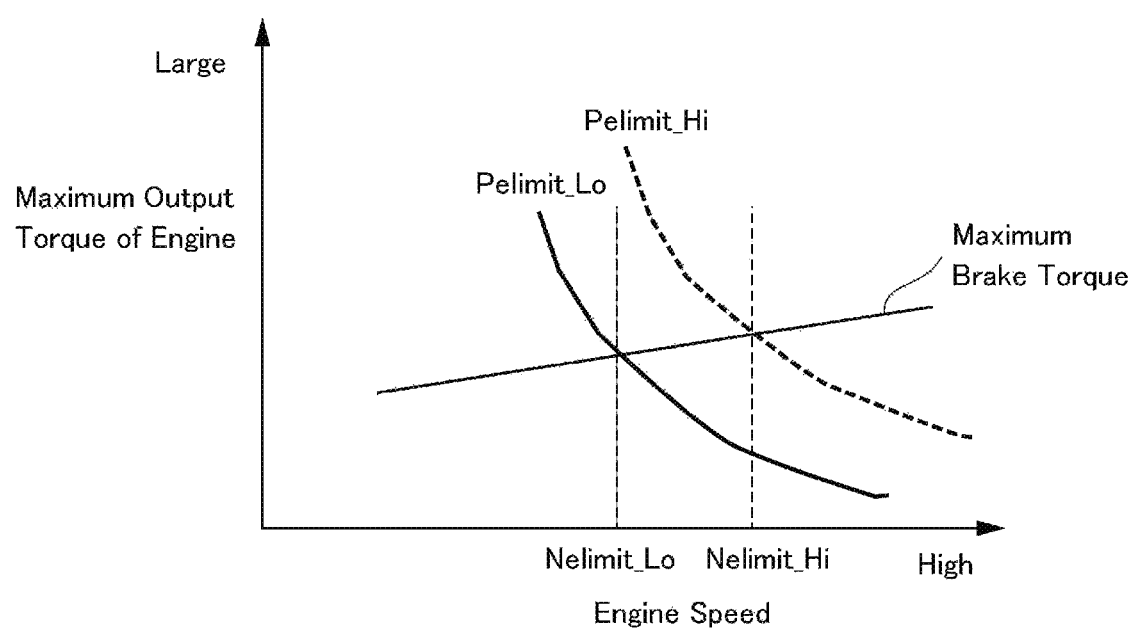
FIG. 14 is a graph showing upper limit outputs of the engine in the HV-Lo mode and the HV-Hi mode.

Upper limit powers of the engine 5 in the HV-Lo mode and the HV-Hi mode are indicated in FIG. 14. In FIG. 14, the horizontal axis represents an engine speed, and the vertical axis represents a maximum output torque of the engine 5. As indicated in FIG. 14, the maximum output torque of the engine 5 increases gradually after the engine speed exceeds a predetermined speed Ne 1. Specifically, the upper limit power of the engine 5 may be obtained by multiplying a maximum output torque of the engine 5 by an upper limit speed of the engine 5. In FIG. 14, the upper limit power of the engine 5 in the HV-Lo mode is indicated by a solid curve Pelimit_Lo, and the upper limit power of the engine 5 in the HV-Hi mode is indicated by a dashed curve Pelimit_Hi. As can be seen from FIG. 14, the upper limit power of the engine 5 is greater in the HV-Hi mode than that in the HV-Lo mode. In FIG. 14, an upper limit speed of the engine 5 in the HV-Lo mode is indicated by the vertical dashed line Nelimit_Lo, and an upper limit speed of the engine 5 in the HV-Hi mode is indicated by the vertical dashed line Nelimit_Hi.

As described, in the HV-Lo mode, the ratio of the torque delivered to the output side is greater than that in the HV-Hi mode. Accordingly, even if the upper limit power of the engine 5 in the HV-Lo mode is smaller than that in the HV-Hi mode, the power (or the torque) delivered to the ring gear 18 is increased. Here, an amount of energy regenerated by the first motor 6 in the HV-Lo mode may be smaller than that in the HV-Hi mode.

Given that a gear ratio between the output gear 21 and the driven gear 23, and a gear ratio between the drive gear 28 and the driven gear 23 are "1", the drive force in the HV-Lo mode and the drive force in the HV-Hi mode may be calculated by adding a torque delivered from the ring gear 18 to an output torque of the second motor 7. As described, the electricity generated by the first motor 6 and the electricity accumulated in the battery 47 may be supplied to the second motor 7. That is, when the electric power can be supplied sufficiently from the battery 47 to the second motor 7 to generate the rated torque, to the second motor 7 is allowed to generate the maximum torque irrespective of a generation amount of the first motor 6. In this case, therefore, the maximum output torque of the second motor will not be changed in the HV-Lo mode and the HV-Hi mode. The maximum drive force to propel the vehicle is governed by an output power (or torque) of the ring gear 18 and an output power of the second motor 7. For this reason, a larger drive force may be generated in the HV-Lo mode than the HV-Hi mode in a difference in a magnitude of the output power (or torque) of the ring gear 18. In the present disclosure, a definition of the "maximum drive force" is an upper limit value of an available drive force taking account of a speed restriction on the rotary members and so on.

If an SOC level of the battery 47 is low, if a temperature of the battery 47 is low, or if a temperature of the battery 47 is raised to almost an upper limit temperature, the electric power may not be supplied sufficiently from the battery 47 to the second motor 7. When the power supply from the battery 47 to the second motor 7 is thus restricted, a total value of the electric power supplied to the second motor 7 varies depending on a generation amount of the first motor 6. For example, in the HV-Lo mode in which the ration of the power delivered to the first motor 6 side is small, the electric power supplied to the second motor 7 is reduced from that in the HV-Hi mode. If such change in the output torque of the second motor 7 due to difference in the electric power supplied to the battery 47 is greater than a difference in the output power of the ring gear 18 between the HV-Hi mode and the HV-Lo mode, a larger drive force can be generated in the HV-Hi mode in comparison with the HV-Lo mode. In addition, an output power of the battery 47 may also be restricted by a temperature of the second power control system 45. According to the embodiment, therefore, the upper limit power possible to be supplied to the battery 47 is determined taking account of conditions of the battery 47 and the second power control system 45.

Figure 15:
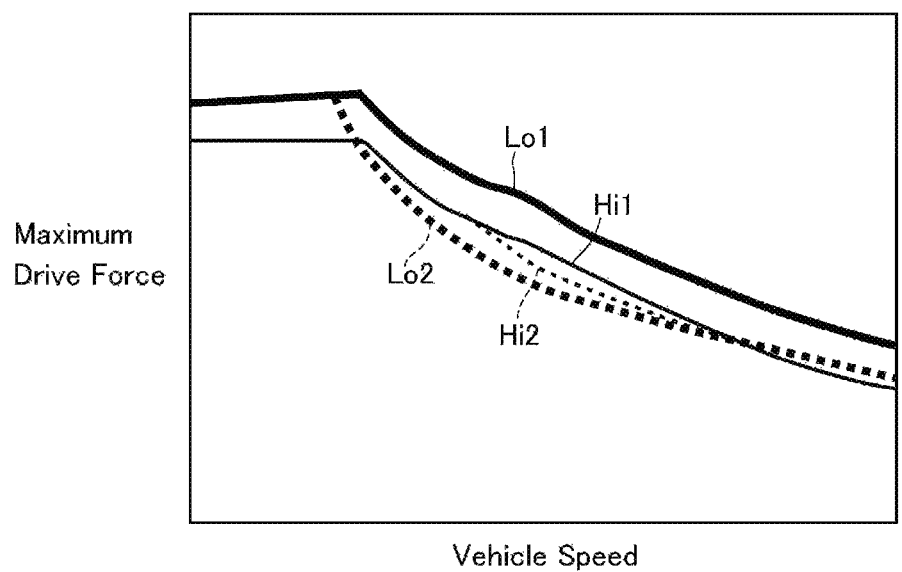
FIG. 15 is a graph showing a change in a maximum drive force in accordance with a change in the available output power of the battery.

FIG. 15 indicates a change in the maximum drive force in accordance with the available output power of the battery 47. In FIG. 15, the horizontal axis represents a vehicle speed, the vertical axis represents the maximum drive force, the curve Lo1 represents the maximum drive force of a case in which the battery 47 can output sufficient power in the HV-Lo mode, the curve Lo2 represents the maximum drive force of a case in which the available output power of the battery 47 is restricted in the HV-Lo mode, the curve Hi1 represents the maximum drive force of a case in which the battery 47 can output sufficient power in the HV-HI mode, and the curve Ho2 represents the maximum drive force of a case in which the available output power of the battery 47 is restricted in the HV-Hi mode.

As indicated in FIG. 15, the maximum drive force in the HV-Lo mode and the maximum drive force in the HV-Hi mode are changed in accordance with the output power of the battery 47. Specifically, when the battery 47 can output the electric power sufficiently, a larger maximum drive force can be generated in the HV-Lo mode. By contrast, when the available output power of the battery 47 is restricted or small, a larger maximum drive force can be generated in the HV-Hi mode.

Figure 16:
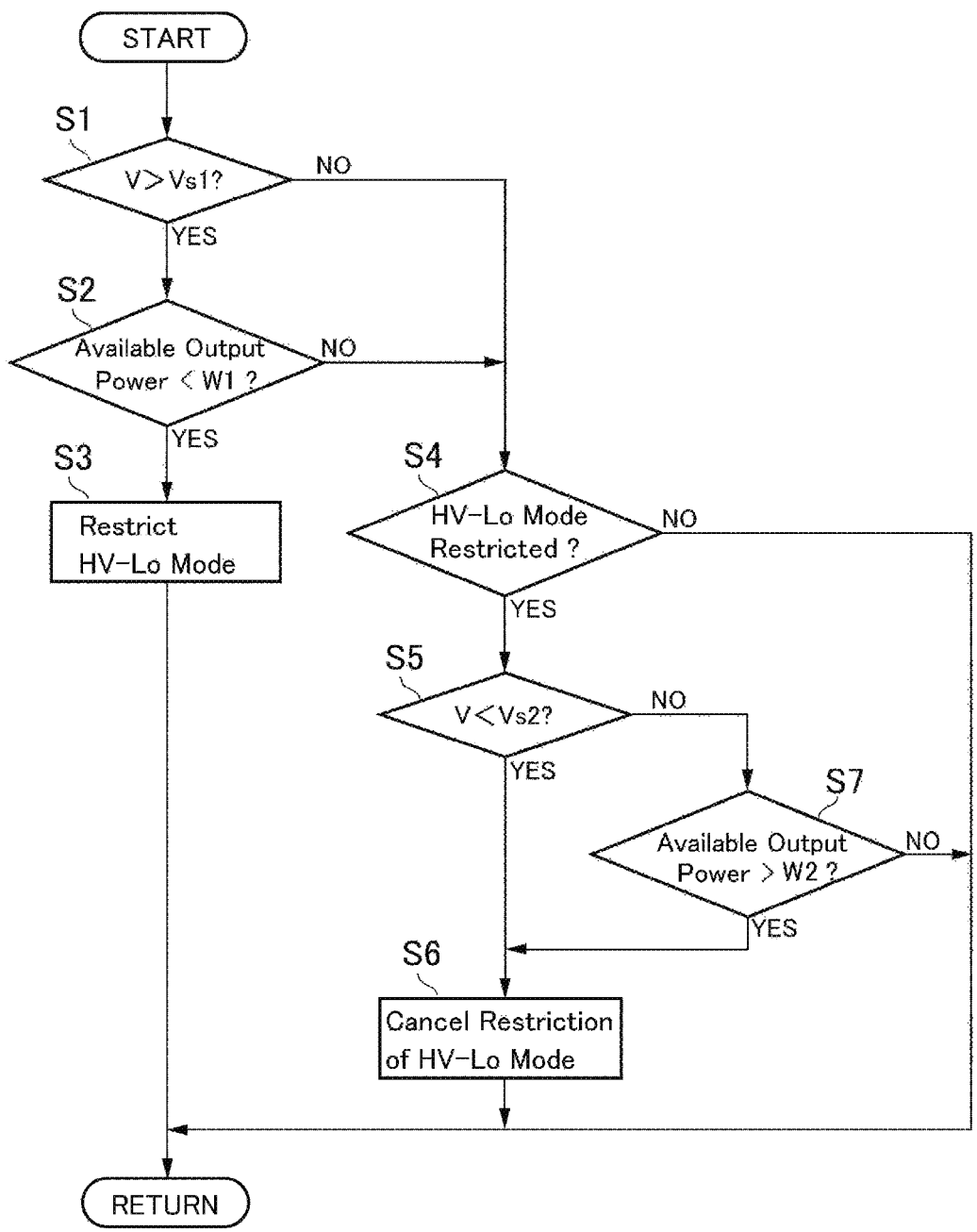
FIG. 16 is a flowchart showing one example of a routine executed by the control system according to the embodiment.

In order to prevent a reduction in the maximum drive force due to reduction in the available output power of the battery 47 supplied to the battery 47, the control system according to the embodiment is configured to execute the routine shown in FIG. 16. At step S1, it is determined whether or not a vehicle speed V is higher than a first predetermined speed Vs1. Specifically, the first predetermined speed Vs1 is set to a level possible to generate the drive force comparable to that of the case in which the electric power can be supplied from the battery 47 sufficiently to the second motor 7, even if the output power of the battery 47 supplied to the second motor 7 is restricted. More specifically, the first predetermined speed Vs1 is set on the basis of a base speed of the second motor 7 in such a manner that the output torque of the second motor 7 is kept constant irrespective of the rotational speed of the second motor 7. The base speed is reduced to a lower speed with a reduction in the available electric power supplied to the second motor 7. Accordingly, the first predetermined speed Vs1 may be set in accordance with the electric power possible to be supplied from the battery 47 to the second motor 7. For example, the first predetermined speed Vs1 may be set to a fixed value at which the electric power can be supplied from the battery 47 sufficiently to the second motor 7, even if the available output power of the battery 47 falls to a lower limit value. Accordingly, the first predetermined speed Vs1 corresponds to a "predetermined vehicle speed" of the embodiment.

If the vehicle speed V is higher than the first predetermined speed Vs1 so that the answer of step S1 is YES, it is determined whether or not the electric power possible to be supplied from the battery 47 to the second motor 7 is reduced to a level at which the drive force to be generated in the HV-Lo mode is reduced lower than the drive force to be generated in the HV Hi mode. The electric power possible to supply from the battery 47 to the second motor 7 is governed by the available output power of the battery 47 and a limit value of the electric power applied to the second power control system 45. As described, the available output power of the battery 47 is governed by the temperature and the SOC level of the battery 47. In the routine shown in FIG. 1, specifically, it is determined at step s2 whether or not the available output power off the battery 47 is smaller than a first threshold power W1 as a predetermined value of the embodiment. To this end, the first threshold power W1 may be set based on a result of an experimentation or simulation.

Specifically, the first threshold power W1 is set to a value possible to fulfill the following relations (1) Wg+Wout<Wm, and (2) Tr_Lo-Tr_Hi<Ts-Tm_Lo. In the inequality (1), "Wg" is a power generated by the first motor 6 by maintaining the engine speed to the upper limit speed Nelimit_Hi in the HV-Hi mode, "Wout" is a power corresponding to the first threshold power W1, and "Wm" is a power consumed by the second motor 7 by generating a rated torque by the second motor 7 at a current vehicle speed. In the inequality (2): "Tr_Lo" is a torque expected to be delivered to the ring gear 18 by rotating the engine 5 at the upper limit speed Nelimit_Lo in the HV-Lo mode; "Tr_Hi" is a torque expected to be delivered to the ring gear 18 by rotating the engine 5 at the upper limit speed Nelimit_Hi in the HV-Hi mode; "Ts" is the rated torque of the second motor 7 at a current vehicle speed; and "Tm_Lo" is an output torque of the second motor 7 generated by controlling the second motor 7 in such a manner as to adjust the output power to the battery 47 within the first threshold power W1, while controlling the first motor 6 in such a manner as to maintain the engine speed to the upper limit speed Nelimit_Lo in the HV-Lo mode.

Instead, the maximum drive forces in the HV-Hi mode and the HV-Lo mode in accordance with the available output power to the battery 47 may also be determined in advance based on a result of experimentation or simulation. In this case, the output power from the battery 47 possible to reduce the maximum drive force in the HV-Lo mode smaller than the maximum drive force in the HV-Hi mode may be employed as the first threshold power W1. Optionally, the first threshold power W1 may be set larger than the value possible to reduce the maximum drive force in the HV-Lo mode smaller than the maximum drive force in the HV-Hi mode, taking account of deterioration of the thermal condition.

If the available output power of the battery 47 is smaller than the first threshold power W1 so that the answer of step S2 is YES, the routine progresses to step S3 to restrict selection of the HV-Lo mode, and thereafter returns. In this case, however, the HV-Lo mode will not be inhibited completely. For example, the current operating mode (e.g., the HV-Hi mode or the fixed mode) may be maintained until a predetermined period of time has elapsed, or until the rotational speed of the second motor 7 is reduced lower than the base speed, even if the condition to shift the operating mode from the HV-Hi mode or the fixed mode to the HV-Lo mode is satisfied with reference to the maps shown in FIGS. 11 and 12. Instead, it is possible to allow selection of the HV-Lo mode when a required drive force can be achieved even if the operating mode is shifted from the HV-Hi mode or the fixed mode to the HV-Lo mode. Further, if the HV-Lo mode is currently selected but the required derive force can be achieved in the HV-Lo mode, it is not necessary to shift the operating mode from the HV-Lo mode to the HV-Hi mode or the fixed mode.

By contrast, if the vehicle speed V is higher than the first predetermined speed Vs1 so that the answer of step S1 is NO, or if the available output power of the battery 47 is greater than the first threshold power W1 so that the answer of step S2 is NO, the routine progresses to step S4 to determine whether or not the selection of the HV-Lo mode is restricted. To this end, a flag representing a restriction of selection of the HV-Lo mode is turned on when the restriction at step S3 is executed, and the determination at step S4 is made based on the flag.

If the selection of the HV-Lo mode is restricted so that the answer of step S4 is YES, the routine progresses to step S5 to determine whether or not the vehicle speed V is lower than a second predetermined speed Vs2. That is, at step S5, it is determined whether or not the restriction of selection of the HV-Lo mode can be cancelled. To this end, specifically, it is determined whether or not the rotational speed of the second motor 7 is reduced lower than the base speed. Specifically, in order to reduce a frequency of the restriction of the HV-Lo mode, the second predetermined speed Vs2 is set to be lower than the first predetermined speed Vs1.

If the vehicle speed V is lower than the second predetermined speed Vs2 so that the answer of step S5 is YES, the routine progresses to step S6 to cancel the restriction of selection of the HV-Lo mode, and to turn off the flag representing the restriction of selection of the HV-Lo mode. Thereafter, the routine returns. By contrast, if the vehicle speed V is higher than the second predetermined speed Vs2 so that the answer of step S5 is NO, the routine progresses to step S7 to determine whether or not the available output power of the battery 47 is greater than a second threshold power W2. That is, at step S7, it is also determined whether or not the restriction of selection of the HV-Lo mode can be cancelled. To this end, specifically, it is determined whether or not the electric power possible to increase the maximum drive force in the HV-Lo mode greater than the maximum drive force in the HV-Hi mode can be outputted from the battery 47. Specifically, in order to reduce the frequency of the restriction of the HV-Lo mode, the second threshold power W2 is set to be greater than the first threshold power W1.

If the available output power of the battery 47 is greater than the second threshold power W2 so that the answer of step S7 is YES, the routine progresses to step S6 to cancel the restriction of selection of the HV-Lo mode, and to turn off the flag representing the restriction of selection of the HV-Lo mode. Thereafter, the routine returns. By contrast, if the available output power of the battery 47 is smaller than the second threshold power W2 so that the answer of step S7 is NO, the routine returns. That is, the restriction of selection of the HV-Lo mode is continued.

Figure 17:
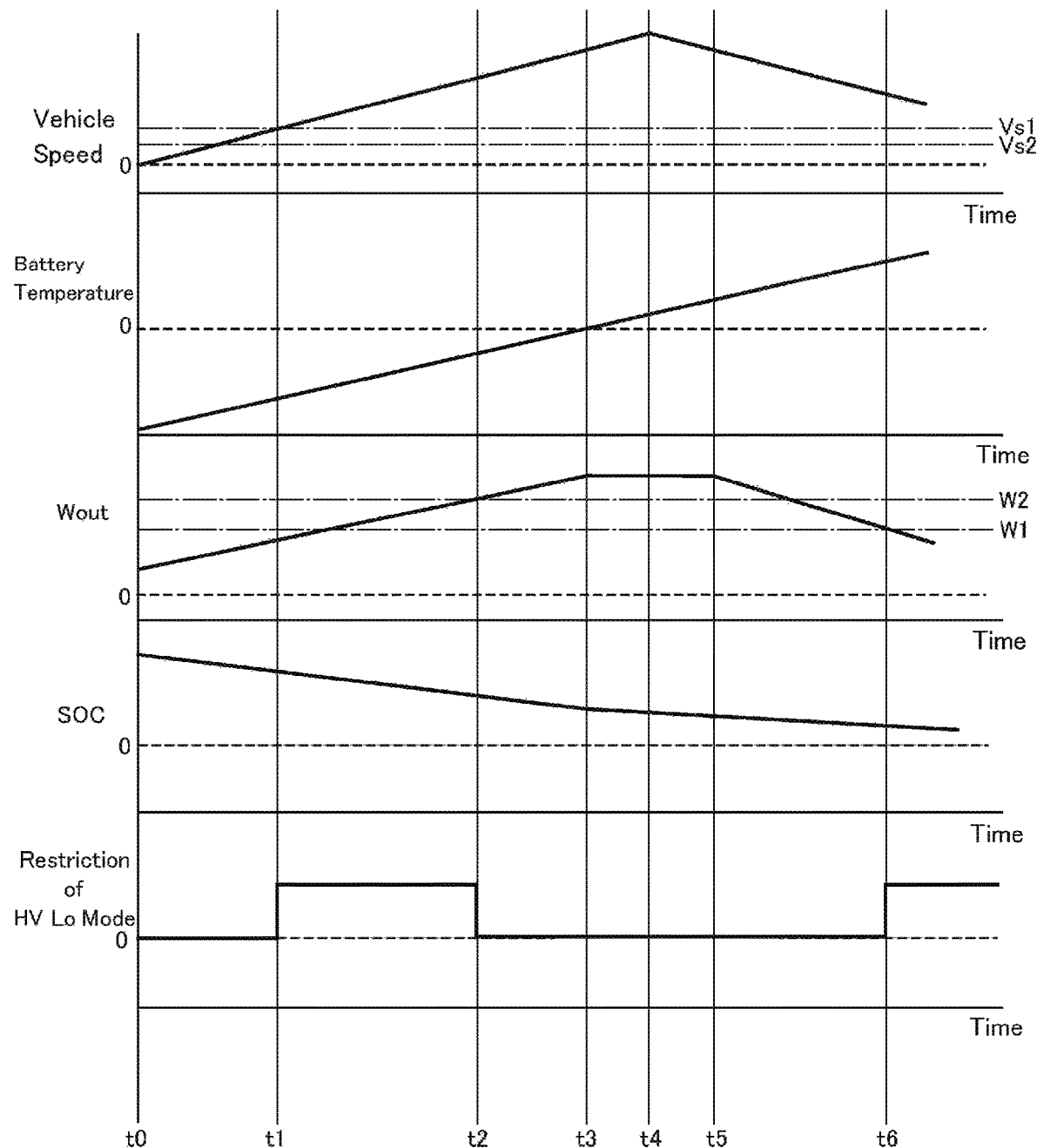
FIG. 17 is a time chart showing a temporal restriction of the HV-Lo mode in accordance with a temporal change in an output power allowed to output from the battery.

FIG. 17 indicates temporal changes in the available output power of the battery 47 and the restriction of selection of the HV-Lo mode, after accelerating the stopping hybrid vehicle to a predetermined speed and then decelerate the hybrid vehicle.

As shown in FIG. 17, the hybrid vehicle is launched at point t0. A speed of the hybrid vehicle reaches the predetermined speed at point t4, and gradually reduced after point t4. In the example shown in FIG. 17, the SOC level of the battery 47 falls gradually from point t0, and after the vehicle speed reaches the predetermined speed, the SOC level of the battery 47 starts falling moderately. The temperature of the battery 47 is raised from point t0 as a result of power output from the battery 47. As described, the maximum output power of the battery 47 is governed by the SOC level and the temperature of the battery 47. In the example shown in FIG. 17, therefore, the maximum output power of the battery 47 is increased from point t0 to point t3 mainly by a temperature rise itself. Then, the temperature of the battery 47 reaches the upper limit value at point t5 and the SOC level of the battery 47 keeps falling in this situation. Therefore, the maximum output of the battery 47 is maintained substantially constant until point t5, and decreases gradually from point t5.

At point t1, the vehicle speed exceeds the first predetermined speed Vs1, and the maximum output power of the battery 47 is smaller than the first threshold power W1. In this situation, therefore, the selection of the HV-Lo mode is restricted.

Then, at point t2, the available output power of the battery 47 exceeds the second threshold power W2, and the restriction of selection of the HV-Lo mode is cancelled at point t2. The available output power of the battery 47 starts decreasing from point t5, and when the available output power of the battery 47 falls below the first threshold power W1 at point t6, the selection of the HV-Lo mode is restricted again. At point t6, since the vehicle speed is higher than the first predetermined speed Vs1, the routine shown in FIG. 16 progresses from step S1 to step S2.

Thus, selection of the HV-Lo mode is restricted when the available output power of the battery 47 decreases to the extent that the maximum drive force expected to be established in the HV-Lo mode based on the current condition is reduced smaller than the maximum drive force expected to be established in the HV-Hi mode based on the current condition. According to the embodiment, therefore, the maximum drive force will not be restricted by the limitation of the available output power of the battery 47. In addition, in the low speed range lower than the first predetermined speed Vs1 and the second predetermined speed Vs2, selection of the HV-Lo mode will not be restricted. According to the embodiment, therefore, the maximum drive force will not be restricted in the low speed range. Specifically, in the low speed range, the drive force indicated by the dashed lime shown in FIG. 15 can be established, and in the remaining speed range, the drive force indicated by the solid lime shown in FIG. 15 can be established.

In the routine shown in FIG. 16, steps S1 and S5 may be omitted. That is, the restriction of the HV-Lo mode may also be determined without reference to the vehicle speed. In this case, the routine progresses directly from step S4 to step S7 if the answer of step S4 is YES.

Figure 18:
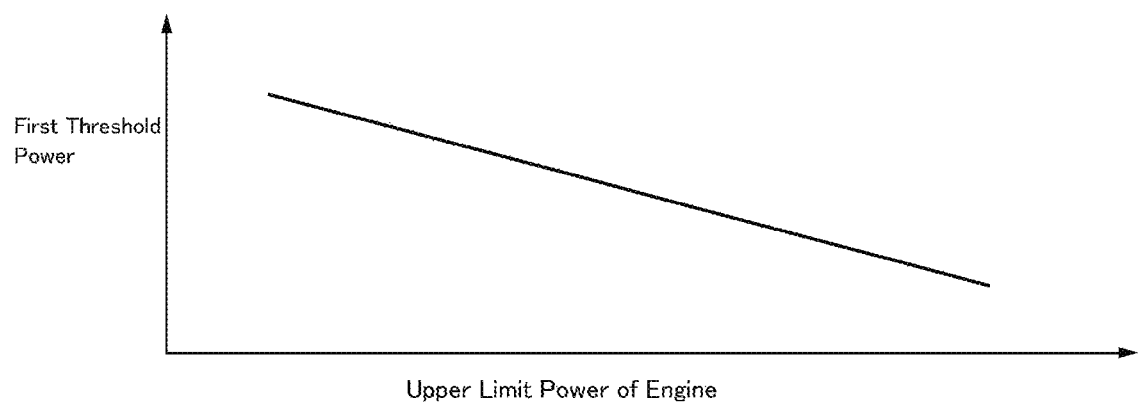
FIG. 18 is a graph showing a change in a first threshold value in accordance with a change in the upper limit output power of the engine.

The power generation of the first motor 6 is increased with an increase in the upper limit power of the engine 5. That is, even if the second motor 7 is supplied small amount of electric power from the battery 47, the electric power will be supplied sufficiently to the second motor 7 by generating the electric power by the first motor 6. According to the embodiment, therefore, the first threshold power W1 may be reduced with an increase in the upper limit power of the engine 5 in the HV-Lo mode. To this end, the determination at step S2 may be made with reference to a map shown in FIG. 18. The map shown in FIG. 18 may be prepared based on a result of an experimentation or a simulation, and in FIG. 18, the horizontal axis represents the upper limit power of the engine 5 in the HV-Lo mode, and the vertical axis represents the first threshold power W1.

Figure 19:
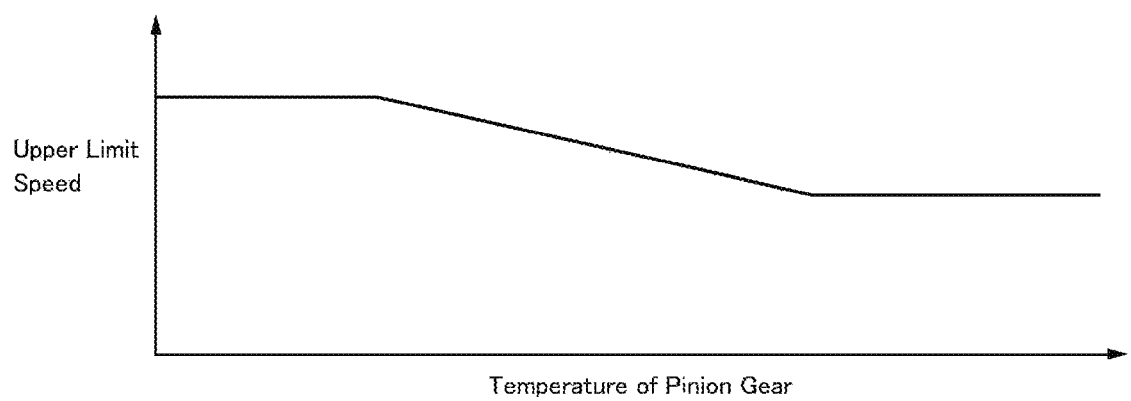
FIG. 19 is a graph showing an allowable speed of a pinion gear in accordance with a change in a temperature of the pinion gear.
Figure 20:
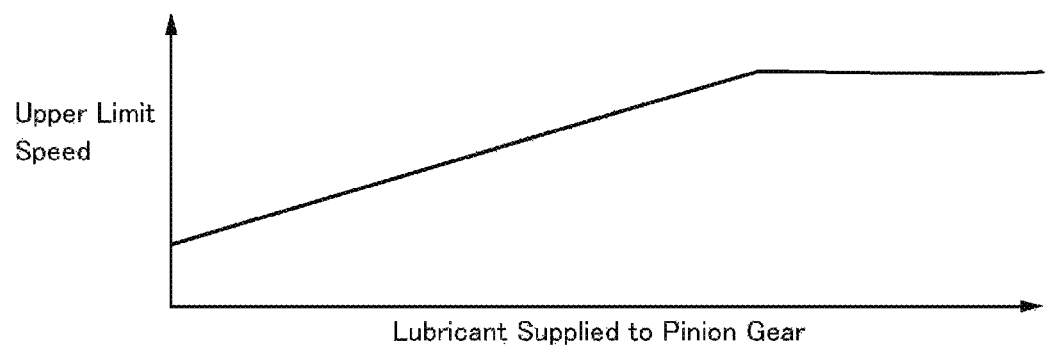
FIG. 20 is a graph showing the allowable speed of a pinion gear in accordance with a change in an amount of lubricant applied to the pinion gear.

As described, the upper limit power of the engine 5 is set on the basis of the allowable speed of the pinion gear 13 as an upper limit speed at which the pinion gear 13 can be rotated without being damaged. Accordingly, as shown in FIG. 19, the allowable speed of the pinion gear 13 may be reduced with an increase in a temperature of the pinion gear 13. Instead, as shown in FIG. 20, the allowable speed of the pinion gear 13 may be increased with an increase in an amount of lubricant (i.e., oil) supplied to the pinion gear 13. By thus adjusting the allowable speed of the pinion gear 13, the output power of the engine 5 will not be restricted excessively to prevent shortage of the drive force. For this purpose, a temperature sensor may be arranged in the vicinity of the pinion gears 13 to measure a temperature of the pinion gears 13. Instead, the temperature of the pinion gear 13 may be estimated based on a magnitude of the torque applied to the pinion gear 13, or based on an oil temperature in the first drive unit 2.

As a result of restricting the selection of the HV-Lo mode by carrying out the routine shown in FIG. 16, it is possible to avoid a reduction in the maximum drive force due to selection of the HV-Hi mode and the fixed mode. However, a required drive force may not be achieved in the HV-Hi mode and the fixed mode. In order to avoid such disadvantage, it is preferable to promptly increase the electric power supplied from the battery 47 to the second motor 7. To this end, the control system according to the embodiment may be further configured to execute a cancellation control to increase the available output power of the battery 47 during restricting the selection of the HV-Lo mode.

Figure 21:
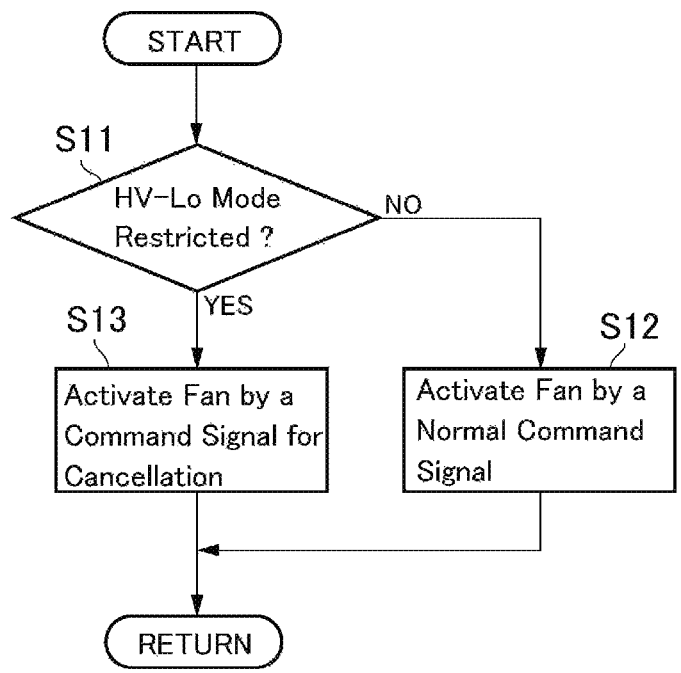
FIG. 21 is a flowchart showing one example of a routine to change a command signal to a cooling fan so as to increase an available output from the battery.

An example of the cancellation control is shown in FIG. 21. For example, the routine shown in FIG. 21 is commenced when the available output power of the battery 47 is limited due to temperature rise in the battery 47. At step S11, it is determined whether or not the selection of the HV-Lo mode is restricted. Such determination at step S11 may be made by the same procedure as the determination at step S4 in the routine shown in FIG. 16.

If the selection of the HV-Lo mode is not restricted so that the answer of step S11 is NO, the routine progresses to step S12 to activate the cooling fan F based on a command signal for the normal control. Thereafter, the routine returns. By contrast, if the selection of the HV-Lo mode is restricted so that the answer of step S11 is YES, the routine progresses to step S13 to activate the cooling fan F based on a command signal for the cancellation control. Thereafter, the routine returns.

Figure 22:
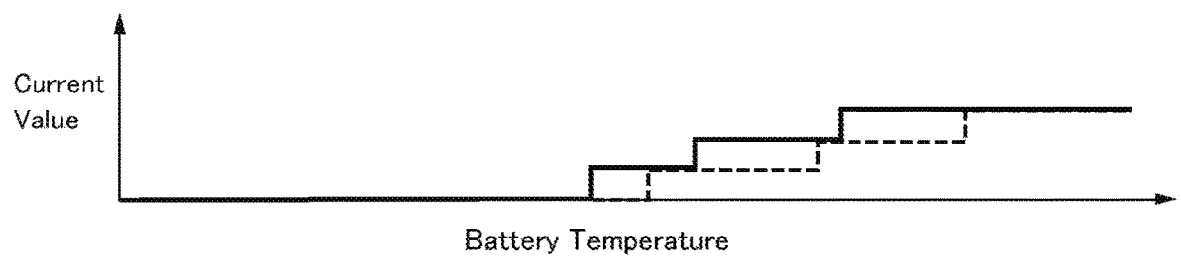
FIG. 22 is a graph showing a change in the command signal to the cooling fan in accordance with a current value.

An example of the command signal for activating the cooling fan F is shown in FIG. 22. In FIG. 22, the horizontal axis represents a temperature of the battery 47, the vertical axis represents a current value applied to the cooling fan F, the solid line represents a current value applied to the cooling fan F when carrying out the cancellation control, and the dashed line represents a current value applied to the cooling fan F in the normal condition. As shown in FIG. 22, in a case of carrying out the cancellation control, a relatively large current is applied to the cooling fan F from a relatively low temperature. In this case, therefore, the battery 47 can be cooled promptly to ease the limitation of the available output power of the battery 47. In other words, the restriction of selection of the HV-Lo mode can be cancelled promptly. To this end, a water-cooling system may also be used instead of the cooling fan F. In this case, a flow rate of the water is increased when carrying out the cancellation control to cool the battery 47 promptly.

In addition, when the SOC level of the battery 47 drops, the selection of the HV-Lo mode may also be restricted due to reduction in the available output power of the battery 47. In order to avoid such disadvantage, it is preferable to promptly to raise the SOC level of the battery 47. To this end, the control system according to the embodiment is further configured to execute another cancellation control shown in FIG. 23.

Figure 23:
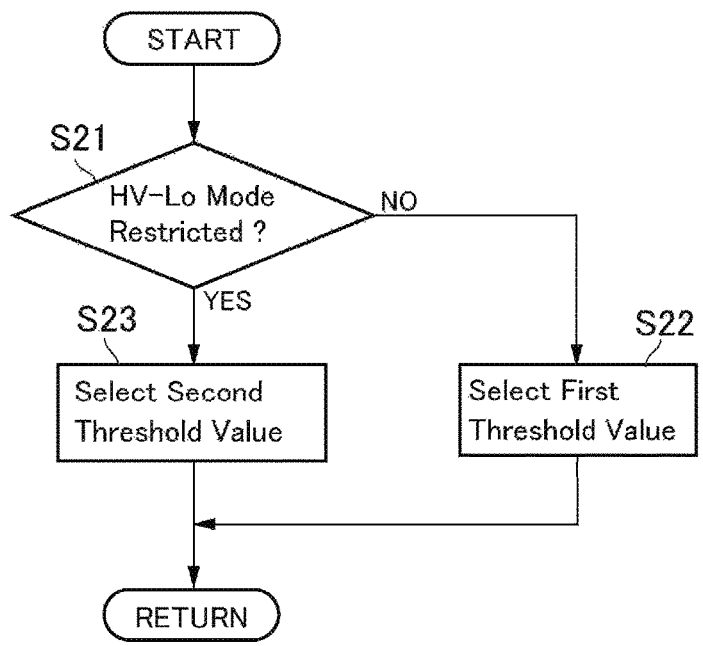
FIG. 23 is a flowchart showing one example of a routine to increase a frequency to start the engine so as to increase the available output from the battery.

The routine shown in FIG. 23 is executed to charge the battery 47 by increasing frequency to start the engine 5. According to the routine shown in FIG. 23, specifically, the engine 5 is started when the required power is relatively small.

At step S21, it is determined whether or not the selection of the HV-Lo mode is restricted. Such determination at step S21 may be made by the same procedure as the determination at steps S4 and S11 in the foregoing routines. If the selection of the HV-Lo mode is not restricted so that the answer of step S21 is NO, the routine progresses to step S22 to select a first starting threshold value of the required power to start the engine 5 in the normal condition, and thereafter, the routine returns. By contrast, if the selection of the HV-Lo mode is restricted so that the answer of step S21 is YES, the routine progresses to step S23 to select a second starting threshold value of the required power to start the engine 5 that is smaller than the first starting threshold value.

When the selection of the HV-Lo mode is restricted, frequency to translate the kinetic energy generated by the engine 5 into an electric energy by the first motor 6 is increased so that the battery 47 is charged promptly. Consequently, the SOC level of the battery 47 can be raised promptly. In other words, the restriction of selection of the HV-Lo mode can be cancelled promptly.

Although the above exemplary embodiments of the present application have been described, it will be understood by those skilled in the art that the present application should not be limited to the described exemplary embodiments, and various changes and modifications can be made within the spirit and scope of the present application.

According to the embodiment, the first differential mechanism is adapted to perform a differential action among a first rotary element connected to an engine; a second rotary element connected to a motor; and a third rotary element connected to drive wheels. The second differential mechanism is also adapted to perform a differential action among: a fourth rotary element; a fifth rotary element connected to the third rotary element; and a sixth rotary element. The hybrid vehicles comprises: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element.

What is claimed is:

1. A drive force control system for a hybrid vehicle, comprising:
an engine;
a first rotary machine that translates an output power of the engine partially into an electric power;
a transmission mechanism that distributes an output torque of the engine to the first rotary machine side and an output member side, wherein an operating mode can be selected from a first mode in which the output torque of the engine is delivered to the output member side at a first predetermined ratio, and a second mode in which the output torque of the engine is delivered to the output member side at a second predetermined ratio that is smaller than the first predetermined ratio;
a battery;
a second rotary machine to which at least one of the electric power translated by the first rotary machine and an electric power accumulated in the battery is supplied to generate a power,
wherein the control system is configured to generate a maximum drive force to propel the vehicle by operating the engine to generate an upper limit power, while operating the second rotary machine to generate a power by supplying the electric power translated by the first rotary machine and a maximum output power of the battery to the second rotary machine; and a controller that is configured to control the transmission mechanism, wherein the controller is configured to restrict selection of the first mode when an available output power of the battery to be supplied to the second rotary machine is smaller than a predetermined value.

2. The drive force control system for a hybrid vehicle as claimed in claim 1, wherein the threshold power includes an output power of the battery possible to reduce the maximum drive force in the first mode smaller than the maximum drive force in the second mode.

3. The drive force control system for a hybrid vehicle as claimed in claim 1, wherein the predetermined value is reduced with an increase in the upper limit power of the engine.

4. The drive force control system for a hybrid vehicle as claimed in claim 1, wherein the upper limit power of the engine is calculated by multiplying a maximum output torque of the engine by an upper limit speed of the engine, and wherein the upper limit speed of the engine in the first mode is set to be lower than the upper limit speed of the engine in the second mode.

5. The drive force control system for a hybrid vehicle as claimed in claim 4, wherein the transmission comprises a plurality of rotary elements, and wherein the upper limit speed of the engine is raised with an increase in an upper limit speed of a predetermined rotary element in the rotary elements.

6. The drive force control system for a hybrid vehicle as claimed in claim 5, wherein the upper limit speed of the predetermined rotary element is lowered with a temperature rise of the predetermined rotary element, and wherein the upper limit speed of the predetermined rotary element is raised with an increase in an amount of lubricant supplied to the predetermined rotary element.

7. The drive force control system for a hybrid vehicle as claimed in claim 1, wherein the controller is further configured to restrict the selection of the first mode when a vehicle speed is higher than a predetermined speed.

8. The drive force control system for a hybrid vehicle as claimed in claim 1, wherein the controller is further configured to execute a cancellation control to cancel the restriction of selection of the first mode by increasing the available output power of the battery supplied to the second rotary machine.

9. The drive force control system for a hybrid vehicle as claimed in claim 8, wherein the available output power of the battery is restricted when a temperature of the battery is raised higher than a predetermined temperature, wherein the drive force control system further comprises a cooling device, and wherein the cancellation control includes a control to cool the battery by the cooling device more promptly during restricting the selection of the first mode, in comparison with a case in which the selection of the first mode is not restricted.

10. The drive force control system for a hybrid vehicle as claimed in claim 8, wherein the controller is further configured to:

select an operating mode of the hybrid vehicle from a hybrid mode in which the hybrid vehicle is powered by the engine and the second rotary machine, and an electric vehicle mode in which the hybrid vehicle is powered by the second rotary machine without using the engine; and start the engine when a required power is greater than a predetermined power; and wherein the cancellation control includes a control to decrease the predetermined power when the selection of the first mode is restricted, in comparison with a case in which the selection of the first mode is not restricted.

* * * * *